United States Patent
Matsumoto

(10) Patent No.: US 9,036,182 B2
(45) Date of Patent: May 19, 2015

(54) IMAGE PROCESSING APPARATUS THAT SENDS IMAGE DATA TO EXTERNAL SERVER, CONTROL METHOD FOR IMAGE PROCESSING APPARATUS, AND STORAGE MEDIUM

(75) Inventor: Yoshitaka Matsumoto, Tokyo (JP)

(73) Assignee: Canon Kabushiki Kaisha (JP)

( * ) Notice: Subject to any disclaimer, the term of this patent is extended or adjusted under 35 U.S.C. 154(b) by 725 days.

(21) Appl. No.: 12/899,720

(22) Filed: Oct. 7, 2010

(65) Prior Publication Data

US 2011/0090531 A1  Apr. 21, 2011

(30) Foreign Application Priority Data

Oct. 15, 2009  (JP) .................................. 2009-238161

(51) Int. Cl.
*G06F 3/12* (2006.01)
*H04N 1/32* (2006.01)
*H04N 1/00* (2006.01)

(52) U.S. Cl.
CPC ....... *H04N 1/32112* (2013.01); *H04N 1/00244* (2013.01); *H04N 1/00464* (2013.01); *H04N 1/00501* (2013.01); *H04N 1/00506* (2013.01); *H04N 1/00973* (2013.01); *H04N 2201/3204* (2013.01); *H04N 2201/3273* (2013.01); *H04N 2201/3274* (2013.01); *H04N 2201/3276* (2013.01); *H04N 2201/3278* (2013.01); *Y10S 707/99941* (2013.01)

(58) Field of Classification Search
None
See application file for complete search history.

(56) References Cited

U.S. PATENT DOCUMENTS

| 5,539,530 | A | 7/1996 | Reifman et al. |
| 2002/0111788 | A1* | 8/2002 | Kimpara ........................... 704/2 |
| 2003/0011633 | A1 | 1/2003 | Conley et al. |
| 2003/0070158 | A1 | 4/2003 | Lucas et al. |
| 2005/0131948 | A1 | 6/2005 | Parkinson |
| 2005/0168774 | A1* | 8/2005 | Eguchi et al. ................ 358/1.15 |
| 2005/0182777 | A1* | 8/2005 | Block et al. ................... 707/100 |
| 2005/0278710 | A1 | 12/2005 | Lucas et al. |

(Continued)

FOREIGN PATENT DOCUMENTS

| EP | 2 015 554 A1 | 1/2009 |
| JP | 7-154526 A | 6/1995 |
| WO | 03/005213 A1 | 1/2003 |

OTHER PUBLICATIONS

Extended European search report issued in corresponding European Patent Application 10187531.8 dated Feb. 1, 2011.

*Primary Examiner* — Miya J Cato
(74) *Attorney, Agent, or Firm* — Rossi, Kimms & McDowell LLP

(57) ABSTRACT

An image processing apparatus that can store a plurality of operations and easily import a template prescribing operations of the image processing apparatus to change GUI definitions. Property information is set which is for setting accompanying information added to image data sent to a server, and has a name part and a value part in which a name and a value, respectively, of the accompanying information are defined. Whether or not information indicative of a second name and information indicative of a second value are included in the value part is determined. When the information indicative of the second name and the information indicative of the second value are included in the value part, the name defined in the name part is converted to the second name, and the value defined in the value part is converted to the second value. The second name and the second value are displayed.

7 Claims, 10 Drawing Sheets

(56) References Cited

U.S. PATENT DOCUMENTS

| | | |
|---|---|---|
| 2006/0279798 A1 | 12/2006 | Rudolph et al. |
| 2009/0015876 A1* | 1/2009 | Brown .......................... 358/405 |
| 2009/0019132 A1* | 1/2009 | Kamata et al. ................ 709/217 |
| 2010/0073713 A1* | 3/2010 | Chae ........................... 358/1.15 |

* cited by examiner

IMAGE PROCESSING APPARATUS THAT SENDS IMAGE DATA TO EXTERNAL SERVER, CONTROL METHOD FOR IMAGE PROCESSING APPARATUS, AND STORAGE MEDIUM

BACKGROUND OF THE INVENTION

1. Field of the Invention

The present invention relates to an image processing apparatus that sends image data to an external server, a control method for the image processing apparatus, and a computer-readable storage medium storing a program for implementing the method.

2. Description of the Related Art

There is known a technique to provide input support by storing graphical user interfaces (GUI) displayed on a digital multi-function peripheral (MFP), which is an exemplary image processing apparatus, for respective users (see, for example, Japanese Laid-Open Patent Publication (Kokai) No. H07-154526).

According to this technique disclosed in Japanese Laid-Open Patent Publication (Kokai) No. H07-154526, in broad outline, when a user logs in according to a default menu displayed on the MFP and then performs a predetermined operation, contents of the operation are stored in a storage unit of the MFP. When the same user logs in again, the contents of the operation stored in the storage unit are read out, so that the same operation can be skipped.

Moreover, when initial values are set for an application operating according to operation information defined in a template on the MFP, the application refers to the initial values and displays the same on a GUI. Further, GUI definitions defined in a template can be manually changed (customized), and a GUI can be changed by importing the changed template to a predetermined application.

However, the technique disclosed in Japanese Laid-Open Patent Publication (Kokai) No. H07-154526 has the problem that a plurality of operations cannot be stored although operation contents are stored, and subsequent operations can be skipped based on previous operations. Also, the technique disclosed in Japanese Laid-Open Patent Publication (Kokai) No. H07-154526 has the problem that, when changing GUI definitions defined in a template, it takes a lot of time and effort to edit the template and import the edited template to an application.

SUMMARY OF THE INVENTION

The present invention provides an image processing apparatus that can store a plurality of operations, and change GUI definitions by easily importing a template that prescribes operations of the image processing apparatus, a control method for the image processing apparatus, and a computer-readable storage medium storing a program for executing the method.

Accordingly, a first aspect of the present invention provides an image processing apparatus that is connected to a server for communication therewith, comprising an obtainment unit configured to obtain setting information that is for use in setting accompanying information added to image data sent to the server, and has a name part in which a name of the accompanying information is defined and a value part in which a value of the accompanying information is defined, a determination unit configured to determine whether information indicative of a second name and information indicative of a second value are included in the value part of the setting information obtained by the obtainment unit, a conversion unit configured to, when the determination unit determines that the information indicative of the second name and the information indicative of the second value are included in the value part, convert the name defined in the name part to the second name, and convert the value defined in the value part to the second value, and a display unit configured to display the second name and the second value obtained as a result of the conversion by the conversion unit.

Accordingly, a second aspect of the present invention provides a control method for an image processing apparatus that is connected to a server for communication therewith, comprising an obtainment step of obtaining setting information that is for use in setting accompanying information added to image data sent to the server, and has a name part in which a name of the accompanying information is defined and a value part in which a value of the accompanying information is defined, a determination step of determining whether information indicative of a second name and information indicative of a second value are included in the value part of the setting information obtained in the obtainment step, a conversion step of, when it is determined in the determination step that the information indicative of the second name and the information indicative of the second value are included in the value part, converting the name defined in the name part to the second name, and convert the value defined in the value part to the second value, and a display step of displaying the second name and the second value obtained as a result of the conversion in the conversion step.

Accordingly, the third aspect of the present invention provides a non-transitory computer-readable storage medium storing a program for causing a computer to execute the control method.

According to the present invention, a plurality of operations can be stored, and GUI definitions can be changed by easily performing edition of a template that prescribes operations of the image processing apparatus and import of the edited template to an application.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
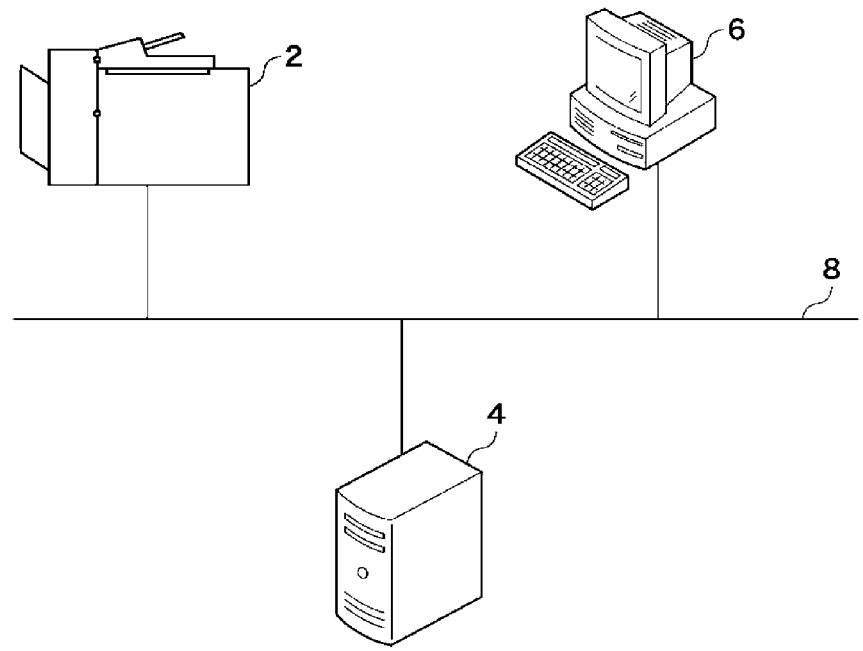
FIG. 1 is a schematic configuration diagram of an image processing system according to an embodiment of the present invention.

FIG. 1 is a schematic configuration diagram of an image processing system according to an embodiment of the present invention. The image processing system is constructed such that an MFP 2 in which various applications are stored, a server 4 for managing the image processing system, and a client PC (information processing apparatus) 6 which is operated by a user are connected together for communication via a LAN 8.

Figure 2:
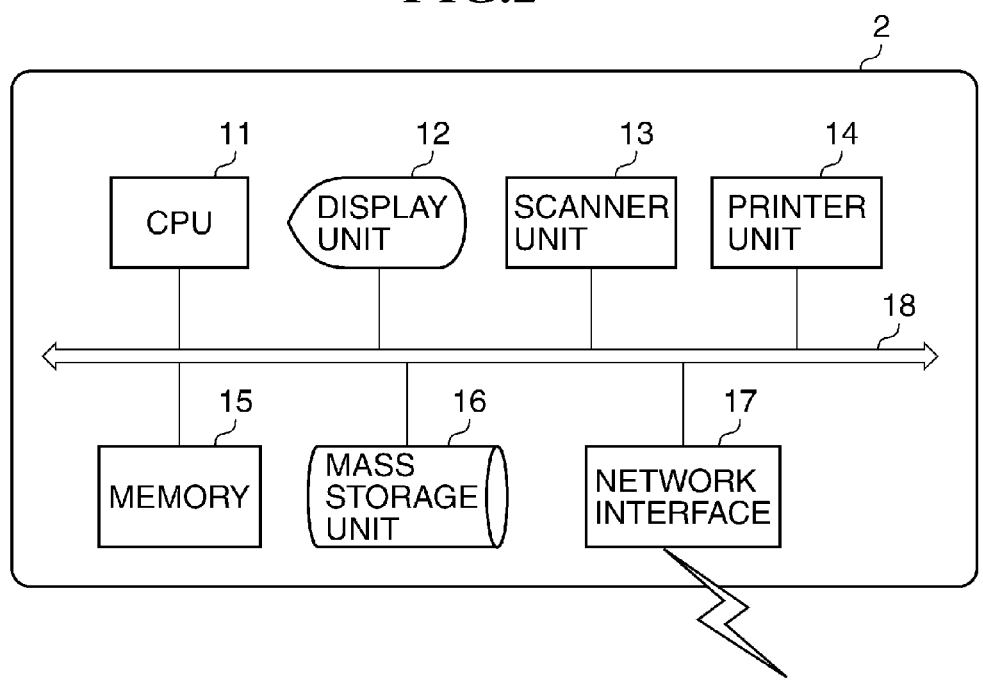
FIG. 2 is a block diagram schematically showing a hardware configuration of an MFP which the image processing system in FIG. 1 has.

FIG. 2 is a block diagram schematically showing a hardware configuration of the MFP 2 which the image processing system has. A CPU 11, which controls the overall operation of the MFP 2, is connected to various units, described later, via an internal bus 18. A display unit 12 displays a GUI on a touch panel (operation panel) or the like. A user can perform, for example, operations for performing a desired operation via the GUI displayed on the display unit 12.

The server 4 holds electronic data such as image data received from the MFP 2. The server 4 also holds property information added to the image data. The property information is accompanying information or supplementary information, such as a company name and a send date and time, related to the image data.

The client PC 6 holds templates that are to be exported to applications in the MFP 2, and sends the templates to the MFP 2. The client PC 6 also provides UI that prompts edition of the templates, and creation and exportation of initial values. The templates will be described later in detail.

A scanner unit 13 reads originals to generate image data. A printer unit 14 prints image data such as scanned images on predetermined sheets.

A memory 15 is used as a work area for expansion, holding, etc. of various instructions (for example, application programs) executed by the CPU 11 so as to control the MFP 2. It should be noted that the memory 15 may store application programs by itself. A mass storage unit 16 stores various application programs for use in the image processing system, image data read by the scanner unit 14, and so on. A network interface 17 enables communication with the server 4 and the client PC 6 via the LAN 8 in accordance with instructions from the CPU 11.

Figure 3:
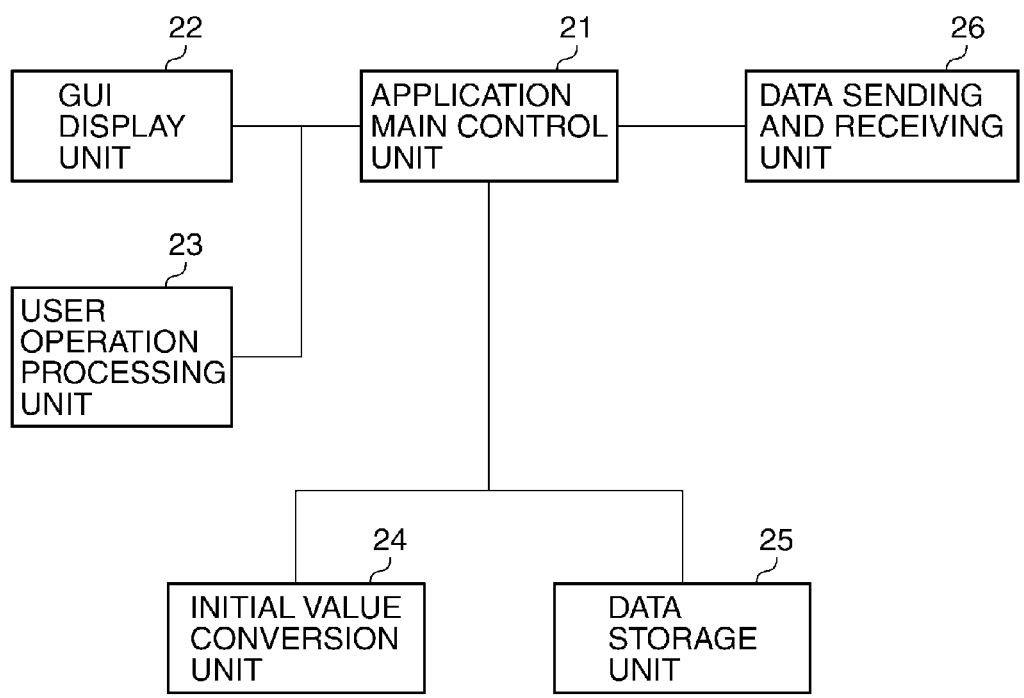
FIG. 3 is a schematic software configuration diagram of an exemplary application operating on the MFP in FIG. 2.

Next, a description will be given of a first processing mode in the image processing system. FIG. 3 is a schematic software configuration diagram of an exemplary application executed by the CPU 11 of the MFP 2.

An application main control unit 21 plays a primary role in controlling the overall operation of the application. A GUI display unit 22 carries out a process to display a UI (user interface), which is an operation screen, on the display unit 12. A user operation processing unit 23 carries out a process to recognize contents of a process performed by a user via the display unit 12.

An initial value conversion unit 24 carries out a process to convert set initial values based on property names and values set by the user. As described later, "initial values" mean initial values of property information, which is to be added to a scanned image, and include "property names" and "values". The property names and the values are set by the user via the GUI display unit 22. The MFP 2 receives initial values from the client PC 6 and stores the same in the mass storage unit 16.

A data storage unit 25 carries out a process to store and read (read out) data in and from the memory 15 and the mass storage unit 16. A data sending and receiving unit 26 carries out a process to send and receive data to and from the server 4 and the client PC 6 via the network interface 17.

Figure 4A:
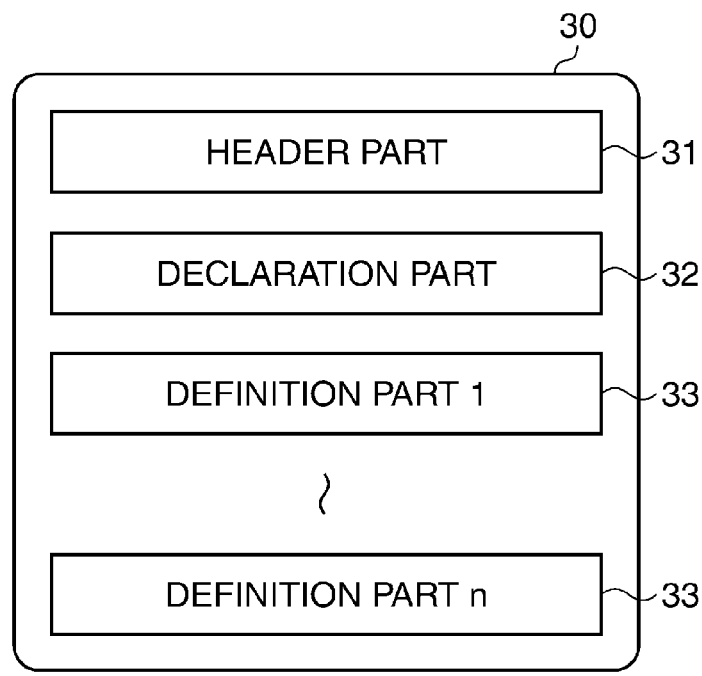
FIGS. 4A and 4B are schematic configuration diagrams of a template that defines operations of an application operating on the MFP in FIG. 2.
Figure 4B:
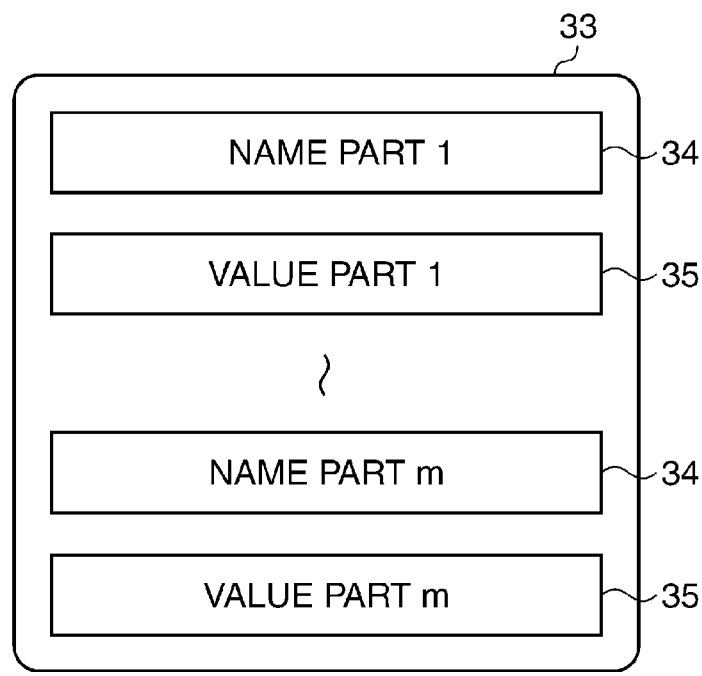

FIGS. 4A and 4B are schematic configuration diagrams of a template that defines operations of an application operating on the MFP 2. A template 30 has a header part 31, a declaration part 32, and definition parts 33. A template is setting information for setting property information. In the present embodiment (the first processing mode), it is assumed that the template 30 is stored in the mass storage unit 16 of the MFP 2.

In the present embodiment, it is assumed that the template 30 is described in XML, but the template 30 may be described in any format other than XML. The header part 31 defines information on the template 30. For example, the header part 31 defines arbitrary information such as a version of the template 30, an application name, and so on. The declaration part 32 defines processes to be executed by the application. For example, types of processes to be executed and an order in which they are executed are defined, and concrete examples of the processes include an authentication process, a folder selection process, and a sending setting process.

The definition parts 33 define details of the processes defined in the declaration part 32, such as names of the processes and information on a GUI to be displayed, for the respective processes. Each of the definition parts 33 has one pair or a plurality of pairs of a name part 34 and a value part 35. For example, assuming that one of the processes is an authentication process, one of the definition parts 33 which defines the authentication process has two pairs of the name part 34 and the value part 35, in which a user name is defined in one pair, and a password is defined in the other pair.

Figure 5A:
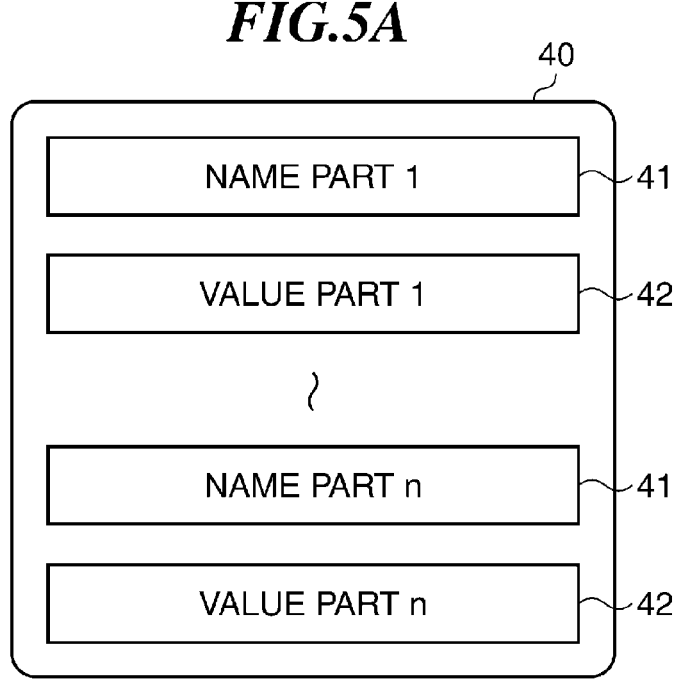
FIGS. 5A and 5B are schematic configuration diagrams of initial values of property information that is displayed on a GUI for reference and added to a scanned image by an application operating on the MFP in FIG. 2.
Figure 5B:
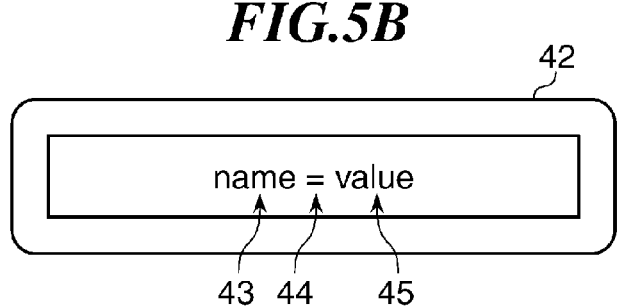

FIGS. 5A and 5B are schematic configuration diagrams of initial values of property information that is to be displayed on a GUI for reference and added to a scanned image by an application operating on the MFP 2. Initial values 40 of property information are comprised of pairs of a name part 41 and a value part 42. In the present embodiment, it is assumed that the initial values 40 are described in XML, but the initial values 40 may be described in any format other than XML.

In the name parts 41 and the value parts 42, arbitrary character strings and numerical values are defined. Arbitrary character strings defined in the name parts 41 are "property names", and character strings and numerical values defined in the value parts 42 are "values". In the name parts 41, the same character strings as those in the name parts 34 of the template 30 are defined so that they can be linked to each other.

The value part 42 is defined by a conversion initial value name 43 and a conversion initial value 45 with an identifier 44 interposed therebetween. When the application recognizes the identifier 44 in the value part 42 of the initial values 40, the initial value conversion unit 34 carries out a conversion process.

In the conversion process, assuming that a name and a value defined in a template are "property 1" and "initial value 1", respectively, and a value defined in a value part of initial values is "company name=manufacturing company", "property 1" and "initial value 1" of property information are converted to "company name" and "manufacturing company", respectively.

The value part 42 having the identifier 44 is defined before the user issues an instruction to perform scanning. For example, the user creates and edits the value part 42 by operating the client PC 6. The creation and edition can be performed in any manner, for example, using a text editor.

The initial values 40 are held in the client PC 6, imported to the MFP 2, and stored in the mass storage unit 16. The initial values 40 may be stored in a nonvolatile memory which the client PC 6 has, or may be stored as a file in a predetermined storage unit (for example, an HDD).

It should be noted that setting of the initial values 40 in a case where the initial values 40 are to be imported to an application operating on the MFP 2, that is, setting of the initial values 40 in an application operating on the MFP 2 may be performed via the LAN 8 by operating the client PC 6. Also, the initial values 40 may be set by operating the display unit 12 on the MFP 2 and obtaining the initial values 40 from the client PC 6. Although the identifier 44 is represented by "=", the present invention is not limited to this, but any other specific character may be used.

Figure 6:
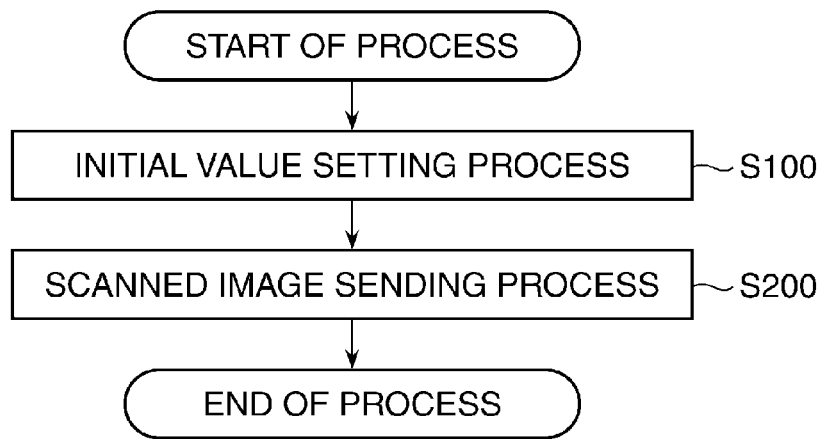
FIG. 6 is a flowchart outlining the flow of a process in a first processing mode executed by the image processing system.

FIG. 6 is a flowchart of a process in the first processing mode executed by the image forming system.

The user operates the client PC 6 to set, via the LAN 8, the initial values 40 in an image processing system application stored in the MFP 2 (step S100). In the step S100, the application main control unit 21 obtains the initial values 40 sent from the client PC 6 via the data sending and receiving unit 26, and stores them in the mass storage unit 16 using the data storage unit 25. Thus, the initial values 40 are set in the application.

Then, in accordance with an instruction from the user input via a GUI of the image processing system application displayed on the display unit 12, the MFP 2 carries out a process to send a scanned image obtained by the MFP 2 to the server 4 (step S200).

Figure 7:
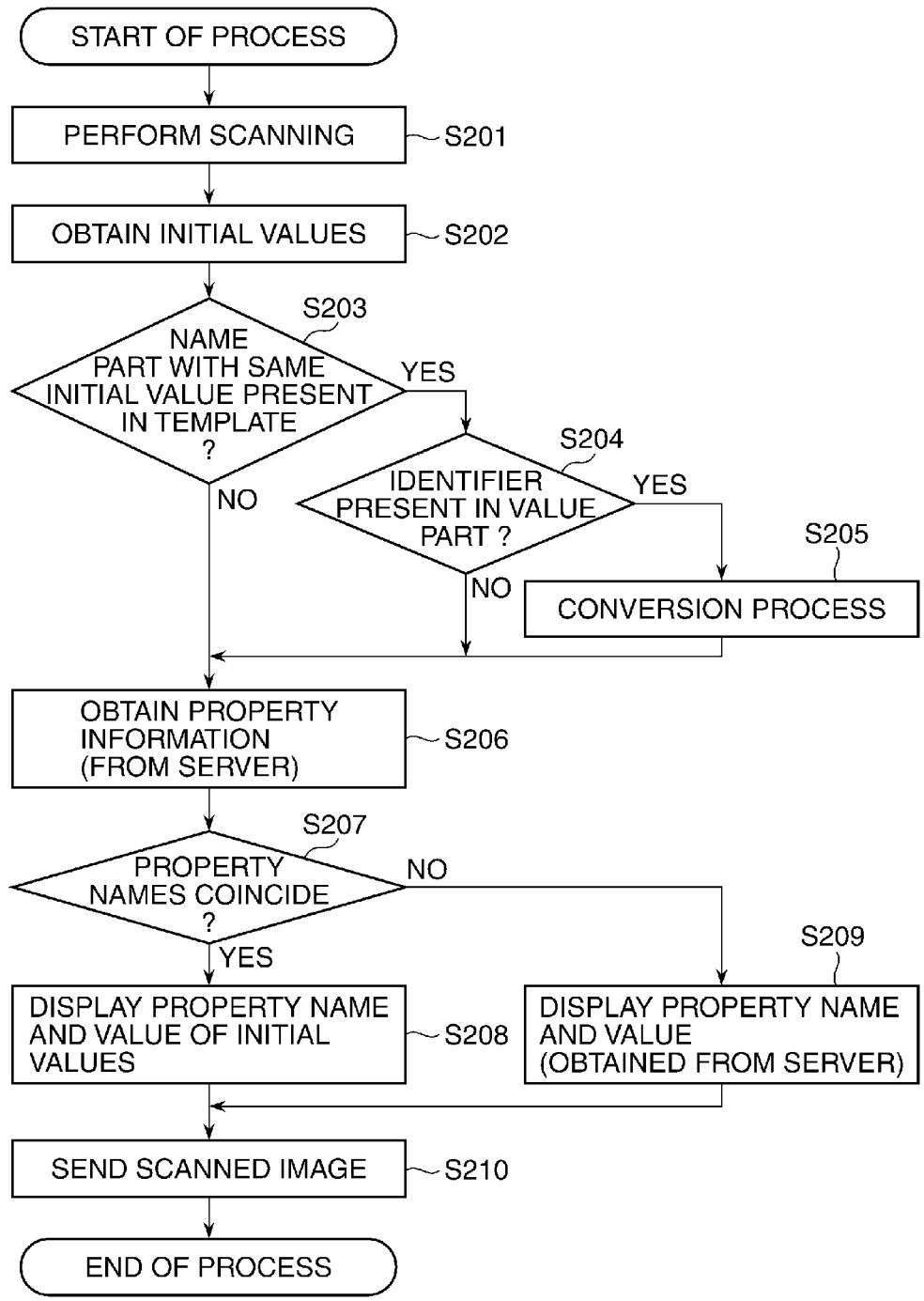
FIG. 7 is a flowchart of a scanned image sending process carried out in step S200 in FIG. 6.

FIG. 7 is a flowchart of a scanned image sending process carried out in the step S200. The process in the flowchart of FIG. 7 is roughly comprised of processes to perform scanning and set property information for an obtained scanned image.

When the user issues an instruction to perform scanning by operating the display unit 12 of the MFP 2, the user operation processing unit 23 recognizes this, and notifies the application main control unit 21 of an event (that is, the instruction to start scanning). The application main control unit 21 receives this event, causes the scanner unit 13 to start scanning, and stores an obtained scanned image in the mass storage unit 16 using the data storage unit 25 (step S201).

Then, the application main control unit 21 obtains the initial values 40 of property information, which is to be added to the obtained scanned image, from the mass storage unit 16, and stores the obtained initial values 40 in the memory 15 using the data storage unit 25 (step S202).

The application main control unit 21 obtains the initial values 40 from the memory 15 using the data storage unit 25, and determines whether or not the name part 41 of the obtained initial values 40 is present in the name parts 34 of the definition parts 33 defined in the template 30 (step S203).

When determining that the name part 41 of the obtained initial values 40 is not present ("NO" in the step S203), the application main control unit 21 proceeds the process to step S206. In the step S206, the application main control unit 21 obtains property information, which is to be added to the scanned image, from the server 4 via the data sending and receiving unit 26 and the network interface 17, and stores the property information in the memory 15 using the data storage unit 25.

On the other hand, when determining in the step S203 that the name part 41 of the obtained initial values 40 is present ("YES" in the step S203), the application main control unit 21 determines whether or not the identifier 44 is present in the value part 42 of the initial values 40 (step S204).

When determining that the identifier 44 is present ("YES" in the step S204), the application main control unit 21 causes the initial value conversion unit 24 to carry out conversion of the initial values 40 (step S205). The initial value conversion unit 24 obtains the identifier 44 from the value part 42 of the initial values 40, and obtains the conversion initial value name 43 (second name) and the conversion initial value 45 (second value) from a character string before the identifier 44 and a character string after the identifier 44, respectively. The initial value conversion unit 24 converts the name part 41 of the initial values 40 in the memory 15 to the conversion initial value name 43, and converts the value part 42 of the initial values 40 in the memory 15 to the conversion initial value 45 using the data storage unit 25, respectively. The initial value conversion unit 24 passes the initial values obtained as a result of the conversion to the application main control unit 21. Then, the process proceeds to the step S206.

After the step S206, the application main control unit 21 compares the conversion initial value name 43 obtained in the step S205 with a property name of the property information obtained in the step S206, and determines whether or not they coincide with each other (step S207).

When it is determined that the conversion initial value name 43 and the property name of the property information coincide with each other ("YES" in the step S207), the conversion initial value name 43 and the conversion initial value 45 obtained as a result of the conversion in the step S205 are displayed on the display unit 12 (step S208).

On the other hand, when it is determined that the conversion initial value name 43 and the property name of the property information do not coincide with each other ("NO" in the step S207), the property name and a value of the property information obtained in the step S206 are displayed on the display unit 12 (step S209).

It should be noted that the application main control unit 21 carries out the processes in the steps S208 and S209 using the GUI display unit 22.

The application main control unit 21 obtains the property name and the value from the display unit 12 using the GUI display unit 22, and stores the obtained property name and value using the data storage unit 25. Moreover, the application main control unit 21 obtains the scanned image obtained in the step S201 from the mass storage unit 16 using the data storage unit 25. Further, the application main control unit 21 sends the obtained property name, value, and scanned image to the server 4 via the data sending and receiving unit 26 and the network interface 17 (step S210), followed by termination of the process.

As described above, according to the first processing mode, in the apparatus that operates according to operation information defined in a template on the MFP, and when initial values are set, refers to the initial values and displays the same on a GUI so that GUI definitions defined in the template can be manually changed (customized), time and effort to import the template can be saved.

Figure 8:
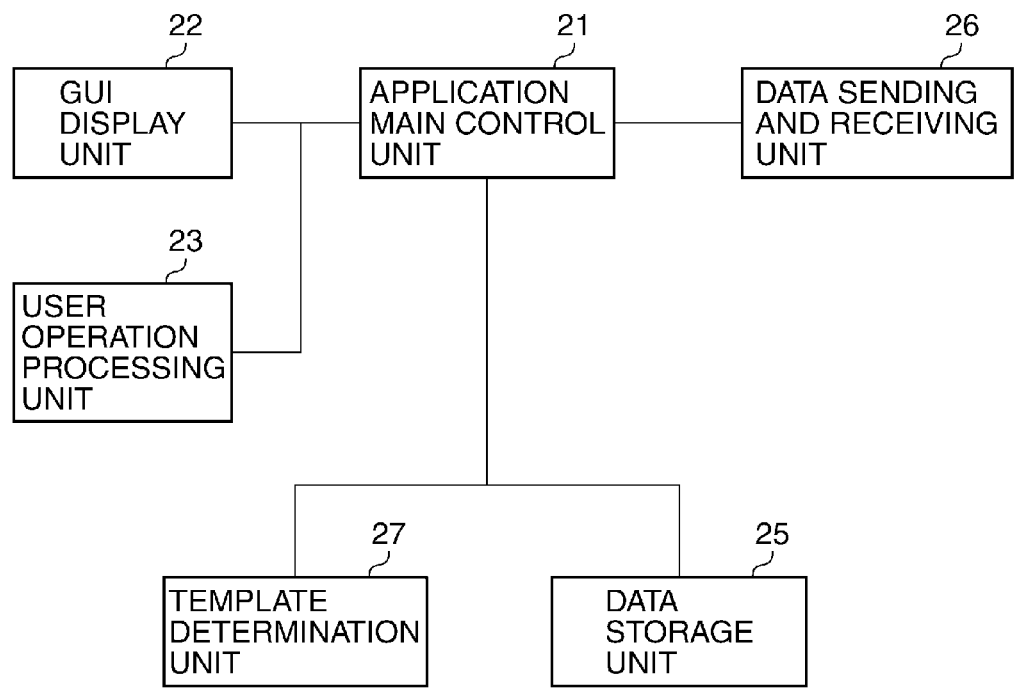
FIG. 8 is a schematic software configuration diagram of another exemplary application operating on the MFP in FIG. 2.

Next, a description will be given of a second processing mode in the image processing system. The image processing system in the second processing mode is the same as that shown in FIG. 1. Also, the hardware configuration of the MFP 2 in the second processing mode is the same as that shown in FIG. 2. FIG. 8 is a software configuration diagram of another exemplary application operating on the MFP 2. This application differs from the application shown in FIG. 3 in that there is a template determination unit 27 in place of the initial value conversion unit 24, but other constitutional requirements are the same.

The template determination unit 27 carries out a process to compare property names of property information, which is obtained from the server 4 so as to be added to a scanned image, with property names which are character strings defined in the name parts 34 constituting the definition parts 33 of the template 30.

Figure 9A:
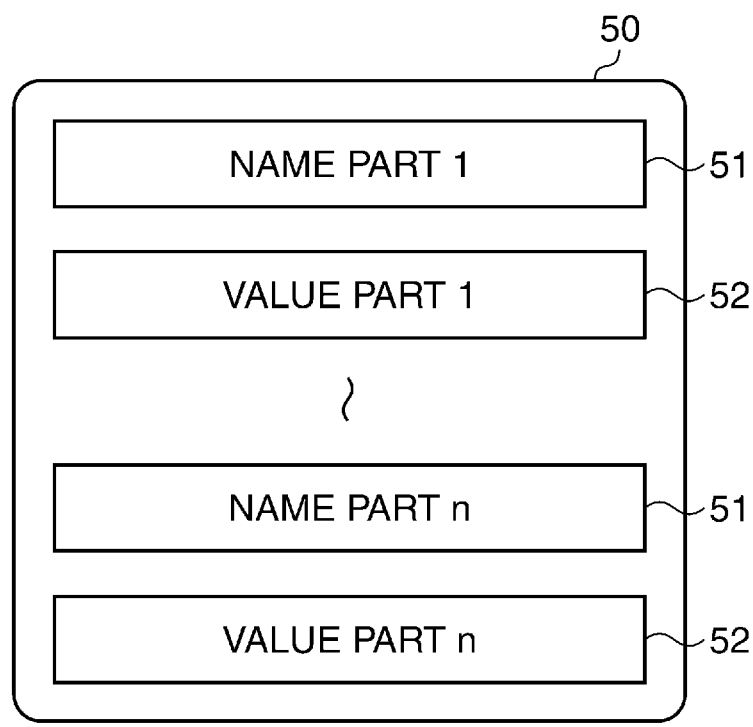
FIGS. 9A and 9B are schematic configuration diagrams of destination information that defines a destination indicative of a server when a scanned image is sent from the MFP in FIG. 1.
Figure 9B:

FIGS. 9A and 9B are schematic configuration diagrams of destination information that defines a destination indicative of the server 4 when a scanned image is sent from the MFP 2. The destination information 50 is comprised of one or a plurality of pairs of a name part 51 and a value part 52. In the present embodiment, it is assumed that the destination information 50 is described in XML, but the destination information 50 may be described in any format other than XML. It is assumed that the destination information 50 is stored in a storage unit (for example, a nonvolatile memory or an HDD) of the client PC 6.

Arbitrary character strings are defined in the name part 51 and the value part 52. The name part 51 is comprised of a character string by which a destination can be uniquely identified. The value part 52 holds a destination to which image data is to be sent. Examples of the destination include a URL such as "HTTP://server/", an IP address, and an electronic mail address.

Figure 10A:
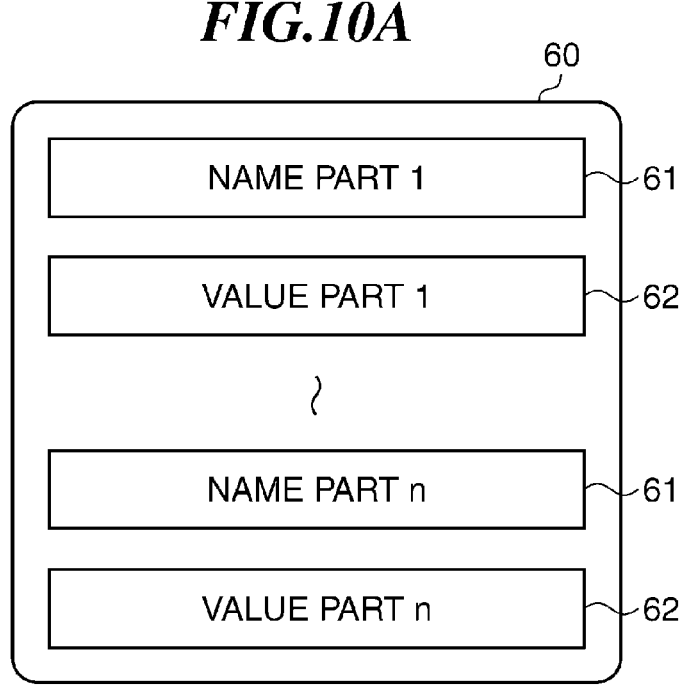
FIGS. 10A and 10B are schematic configuration diagrams of template storage location information on a location at which a template that prescribes operations of an application operating on the MFP in FIG. 2 is stored.
Figure 10B:
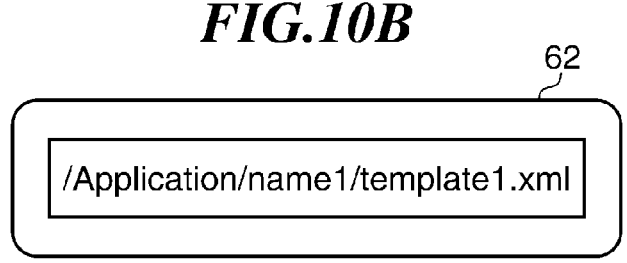

FIGS. 10A and 10B are schematic configuration diagrams of template storage location information on a location at which a template that defines operations of an application operating on the MFP 2 is stored. Template storage location information 60 is comprised of one or a plurality of pairs of a name part 61 and a value part 62. In the present embodiment, it is assumed that the template storage location information 60 is described in XML, but the template storage location information 60 may be described in any format other than XML. As described later, the template storage location information 60 is stored in the mass storage unit 16 of the MFP 2.

Arbitrary character strings are defined in the name part 61 and the value part 62. In the name part 61, the same character string as that in the name part 51 of the destination information 50, in which a destination indicative of the server 4 to which image data is to be sent from the MFP 2 is held, is set.

In the value part 62, information on a storage location at which the template 30 is stored is set. The storage location information may be local folder path information such as "/Application/name1/template1.xml", or network path information such as "¥¥Application¥name1¥template1.xml".

Figure 11:
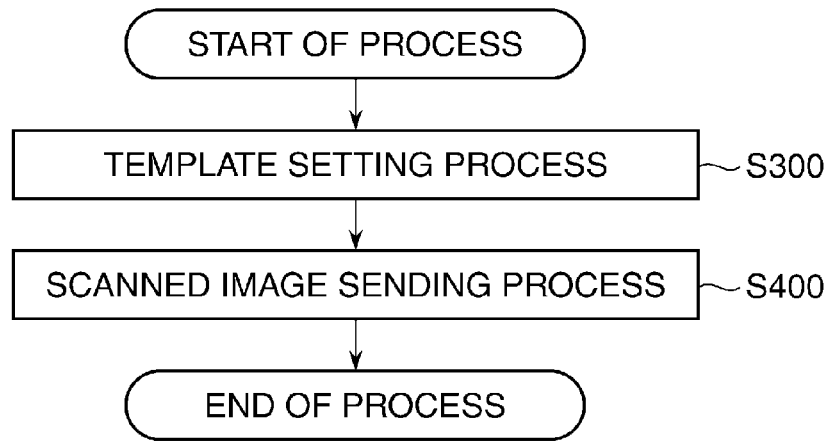
FIG. 11 is a flowchart outlining the flow of a process in a second processing mode executed by the image processing system.

FIG. 11 is a flowchart outlining the flow of a process in the second processing mode executed by the image processing system. In the second processing mode, it is assumed that the template 30 is stored in a storage unit of the client PC 6.

The user operates the client PC 6 to carry out a process to cause, via the LAN 8, an image processing system application, which is stored in the MFP 2, to set a template (step S300). Then, the MFP 2 carries out a scanned image sending process in accordance with an instruction from the user input via a GUI of the image processing system application which is displayed on the display unit 12 (step S400). A detailed description will now be given of the processes in the steps S300 and S400.

Figure 12:
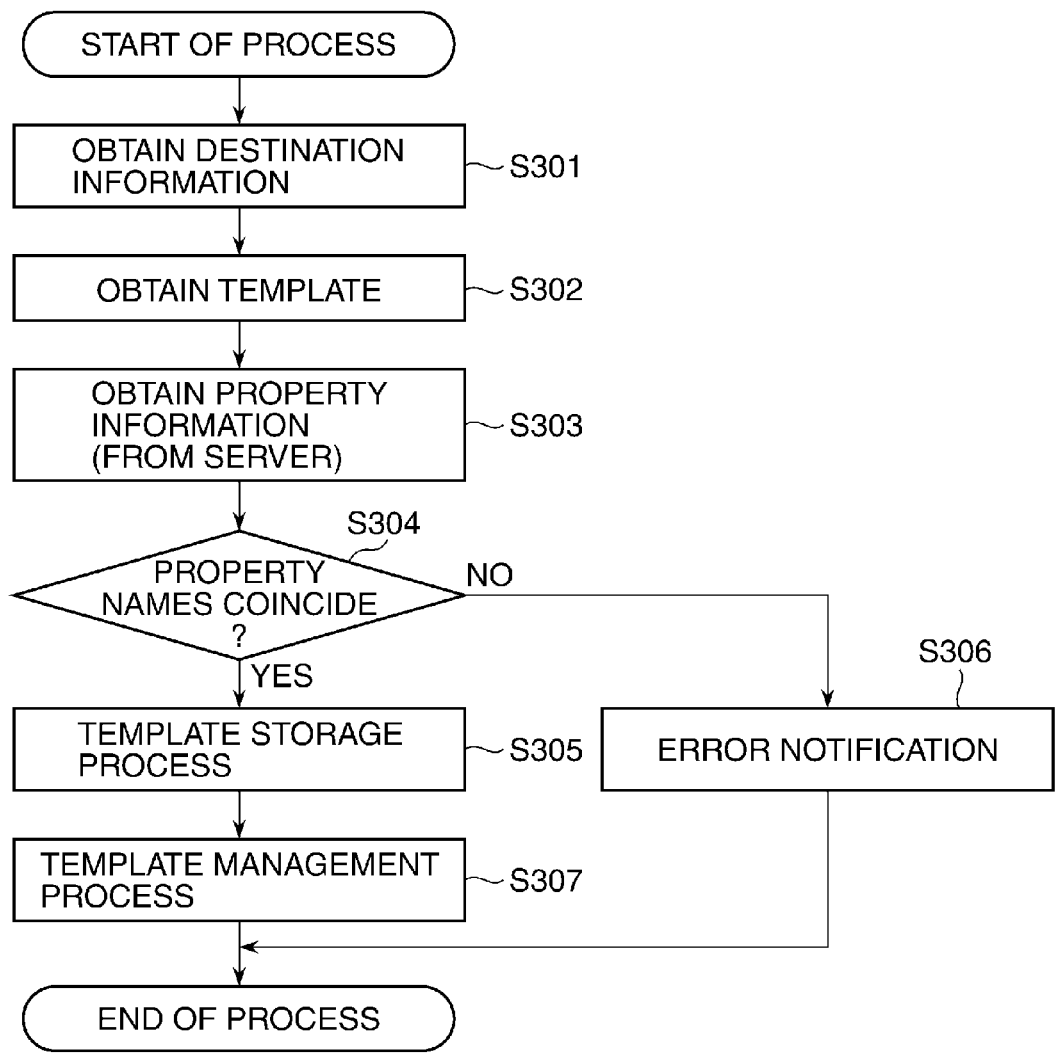
FIG. 12 is a flowchart of a template setting process carried out in step S300 in FIG. 11.

FIG. 12 is a flowchart of the template setting process carried out in the step S300 in FIG. 11.

When the user operates the client PC 6 and starts the image processing system application stored in the MFP 2, the templates 30 and the destination information 50 are displayed on a display unit which the client PC 6 has.

When the user designates desired destination information 50 (it is assumed here that the desired destination information 50 is "destination information 50 indicative of the server 4"), the data sending and receiving unit 26 of the MFP 2 receives the information and notifies the application main control unit 21 of an event. The application main control unit 21 obtains the designated destination information 50 from the client PC 6 via the data sending and receiving unit 26, and stores the designated destination information 50 in the mass storage unit 16 using the data storage unit 25 (step S301).

Also, when the user designates a desired template 30, the data sending and receiving unit 26 receives the information and notifies the application main control unit 21 of an event. The application main control unit 21 obtains the designated template 30 from the client PC 6 via the data sending and receiving unit 26, and stores the designated template 30 in the memory 15 using the data storage unit 25 (step S302).

Then, the application main control unit 21 obtains property information, which is to be added to a scanned image, from the server 4, which is indicated by the destination information 50 stored in the memory 15, via the data sending and receiving unit 26 and the network interface 17 (step S303). The application main control unit 21 stores the property information thus obtained in the memory 15 using the data storage unit 25.

The application main control unit 21 determines whether or not all the property names in the name parts 34 in the definition parts 33 of the template 30 stored in the step S302 and all the property names in the property information stored in the step S303 coincide with each other (step S304). The determination in the step S304 is carried out using the template determination unit 27.

When the template determination unit 27 determines that all the property names in the template 30 and all the property names in the property information coincide with each other ("YES" in the step S304), the application main control unit 21 stores the template 30 in the mass storage unit 16 using the data storage unit 25 (step S305).

On the other hand, when the template determination unit 27 determines that all the property names in the template 30 and all the property names in the property information do not coincide with each other ("NO" in the step S304), the application main control unit 21 sends information to that effect as an error notification to the client PC 6 using the data sending and receiving unit 26, and the client PC 6 displays error information on the display unit (step S306), followed by termination of the process.

After the step S305, the application main control unit 21 creates the template storage location information 60 with the name parts 61 comprised of the property names in the property information, which is to be added to a scanned image, obtained from the server 4 in the step S303, and the value parts 62 comprised of the storage location of the template 30 stored in the step S305 (step S307). This process in the step S307 is referred to as a template management process.

The application main control unit 21 stores the created template storage location information 60 in the mass storage unit 16 using the data storage unit 25, followed by termination of the process.

Figure 13:
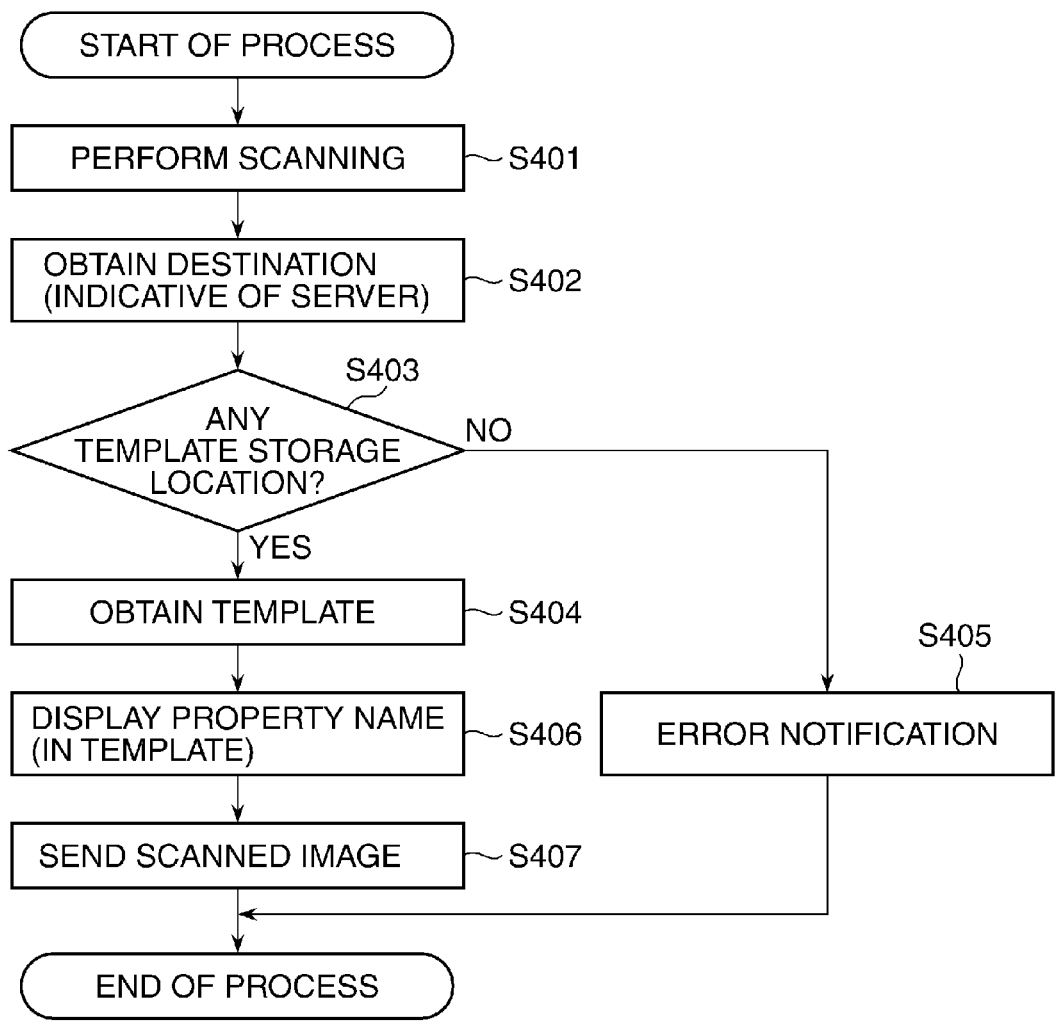
FIG. 13 is a flowchart of a scanned image sending process carried out in step S400 in FIG. 11.

FIG. 13 is a flowchart of the scanned image sending process carried out in the step S400 in FIG. 11. Here, the scanned image sending process is comprised of performing scanning, reading the template 30, and setting properties for a scanned image.

When the user issues an instruction to start a process (that is, perform scanning) by operating the display unit 12, the user operation processing unit 23 recognizes a signal indicative of the instruction, and notifies the application main control unit 21 of an event. The application main control unit 21 causes the scanner unit 13 to start scanning, obtains a scanned image, and stores the obtained scanned image in the mass storage unit 16 using the data storage unit 25 (step S401).

Then, the application main control unit 21 obtains the destination information 50 on the server 4, to which the scanned image is to be sent, from the mass storage unit 16 and stores the same in the memory 15 using the data storage unit 25 (step S402).

Then, the application main control unit 21 determines whether or not there is the template storage location information 60 including the name part 61 coinciding with the name part 51 of the destination information 50 (step S403).

When determining in the step S403 that there is the template storage location information 60 coinciding with the name part 51 of the destination information 50 ("YES" in the step S403), the application main control unit 21 obtains a destination of the template 30 from the value part 62 of the template storage location information 60, and stores the destination in the memory 15 (step S404).

When determining that there is no template storage location information 60 coinciding with the name part 51 of the destination information 50 ("NO" in the step S403), the application main control unit 21 displays information indicating that there is no template 30 as an error notification on the display unit 12 using the GUI display unit 22 (step S405), followed by terminating the process.

After the step S404, the application main control unit 21 displays property names in the template 30 (character strings in the name parts 34 of the definition parts 33) on the display unit 12 using the GUI display unit 22 (step S406).

After that, when the user issues an instruction to start sending the scanned image by operating the display unit 12, the user operation processing unit 23 recognizes a signal indicative of the instruction, and notifies the application main control unit 21 of an event. The application main control unit 21 obtains the property name and values from the display unit 12 using the GUI display unit 22, and stores them in the memory 15 using the data storage unit 25. Further, the application main control unit 21 obtains the scanned image stored in the step S401 from the mass storage unit 16 using the data storage unit 25, and sends the property names, values, and scanned image thus obtained to the server 4 via the data sending and receiving unit 26 and the network interface 17 (step S407), followed by terminating the process.

As described above, according to the second processing mode, in the apparatus that operates according to operation information defined in a template on the MFP, holds a plurality of templates, holds destinations to which scanned images are to be sent, and can perform switching between templates according to destinations, switching between a plurality of templates and switching between a plurality of operations can be done by designating destinations, which results in improvement of operability.

Moreover, although in the above description, the MFP is adopted as an image processing apparatus, the present invention is not limited to this, but an image processing system can be constructed using an image processing apparatus having only a printer function, or an image processing apparatus having only a scanner function.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-238161 filed Oct. 15, 2009 which is hereby incorporated by reference herein in its entirety.

What is claimed is:

1. An image processing apparatus that is connected to a server for communication therewith, comprising:
   an obtainment unit configured to obtain setting information that is for use in setting accompanying information added to image data sent to the server, and has a name part in which a first name of the accompanying information is defined and a value part in which a first value of the accompanying information is defined;
   a determination unit configured to determine whether the first value included in the setting information obtained by said obtainment unit includes a second name to be defined in the name part of the accompanying information and a second value to be defined in the value part of the accompanying information;
   a conversion unit configured to, when said determination unit determines that the information indicative of the second name and the information indicative of the second value are included in the first value part, convert the first name defined in the name part to the second name, and convert the first value defined in the value part to the second value, wherein the first name is different from the second name and the first value is different from the second value; and
   a display unit configured to display the second name and the second value obtained as a result of the conversion by said conversion unit.

2. An image processing apparatus according to claim 1, wherein when a specific identifier is present in the value part of the setting information, said determination unit determines that the information indicative of the second name and the information indicative of the second value are included in the value part.

3. An image processing apparatus according to claim 1, wherein the second value included in the setting information is an initial value of the accompanying information, and the second value displayed by said display unit can be changed in accordance with a user's instruction.

4. An image processing apparatus according to claim 1, wherein the image processing apparatus is connected to an information processing apparatus for communication therewith, and
said obtainment unit obtains setting information sent from the information processing apparatus.

5. An image processing apparatus according to claim 1, further comprising:
an accompanying information obtainment unit configured to obtain second accompanying information from the server; and
a judgment unit configured to judge whether a name and a value included in the second accompanying information obtained by said accompanying information obtainment unit coincide with the second name and the second value obtained as a result of the conversion by said conversion unit,
wherein said display unit displays the value included in the second accompanying information when said judgment unit determines that the name and the value included in the second accompanying information do not coincide with the second name and the second value obtained as a result of the conversion by said conversion unit.

6. A control method for an image processing apparatus that is connected to a server for communication therewith, comprising:
an obtainment step of obtaining setting information that is for use in setting accompanying information added to image data sent to the server, and has a name part in which a first name of the accompanying information is defined and a value part in which a first value of the accompanying information is defined;
a determination step of determining whether the first value included in the setting information obtained by said obtainment step includes a second name to be defined in the name part of the accompanying information and a second value to be defined in the value part of the accompanying information;
a conversion step of, when it is determined in said determination step that the information indicative of the second name and the information indicative of the second value are included in the first value part, converting the first name defined in the name part to the second name, and convert the first value defined in the value part to the second value, wherein the first name is different from the second name and the first value is different from the second value; and
a display step of displaying the second name and the second value obtained as a result of the conversion in said conversion step.

7. A non-transitory computer-readable storage medium storing a program for causing a computer to execute a control method for an image processing apparatus that is connected to a server for communication therewith, the control method comprising:
an obtainment step of obtaining setting information that is for use in setting accompanying information added to image data sent to the server, and has a name part in which a first name of the accompanying information is defined and a value part in which a first value of the accompanying information is defined;
a determination step of determining whether the first value included in the setting information obtained by said obtainment step includes a second name to be defined in the name part of the accompanying information and a second value to be defined in the value part of the accompanying information;
a conversion step of, when it is determined in said determination step that the information indicative of the second name and the information indicative of the second value are included in the first value part, converting the first name defined in the name part to the second name, and convert the first value defined in the value part to the second value, wherein the first name is different from the second name and the first value is different from the second value; and
a display step of displaying the second name and the second value obtained as a result of the conversion in said conversion step.

* * * * *